Figure 1:
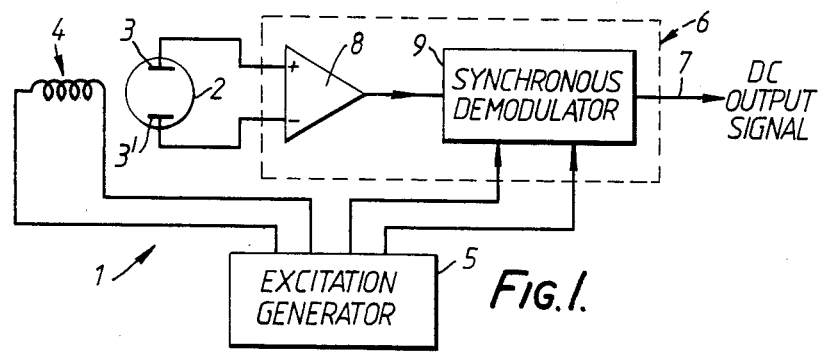

United States Patent [19]

Tiley

[11] Patent Number: 4,748,856
[45] Date of Patent: Jun. 7, 1988

[54] ELECTROMAGNETIC FLOWMETERS AND FLOWMETERING METHODS

[75] Inventor: Michael Tiley, Stroud, Great Britain
[73] Assignee: Danfoss A/S, Nordborg, Denmark
[21] Appl. No.: 6,147
[22] Filed: Jan. 23, 1987
[30] Foreign Application Priority Data
  Feb. 6, 1986 [GB] United Kingdom ............... 8602908
[51] Int. Cl.[4] .............................................. G01F 1/60
[52] U.S. Cl. .............................................. 73/861.17
[58] Field of Search ........................ 73/861.16, 861.17
[56] References Cited
U.S. PATENT DOCUMENTS
  4,658,653 4/1987 Tomita ....................... 73/861.17 X Primary Examiner—Charles A. Ruehl
Attorney, Agent, or Firm—Wayne B. Easton

[57] ABSTRACT

A circuit for an electromagnetic flowmeter comprises means to apply across a fluid the flow of which is to be monitored a magnetic field in the form of pulses in forward and reverse directions, the pulses being spaced apart in time, means to sample induced voltages taken from electrodes in contact with the fluid in synchronism with the magnetic pulses, and means to process the sampled voltages to produce a flow-representing output signal, wherein means are provided to vary the spacing of the sampling instants to render their spacing non-uniform.

34 Claims, 3 Drawing Sheets

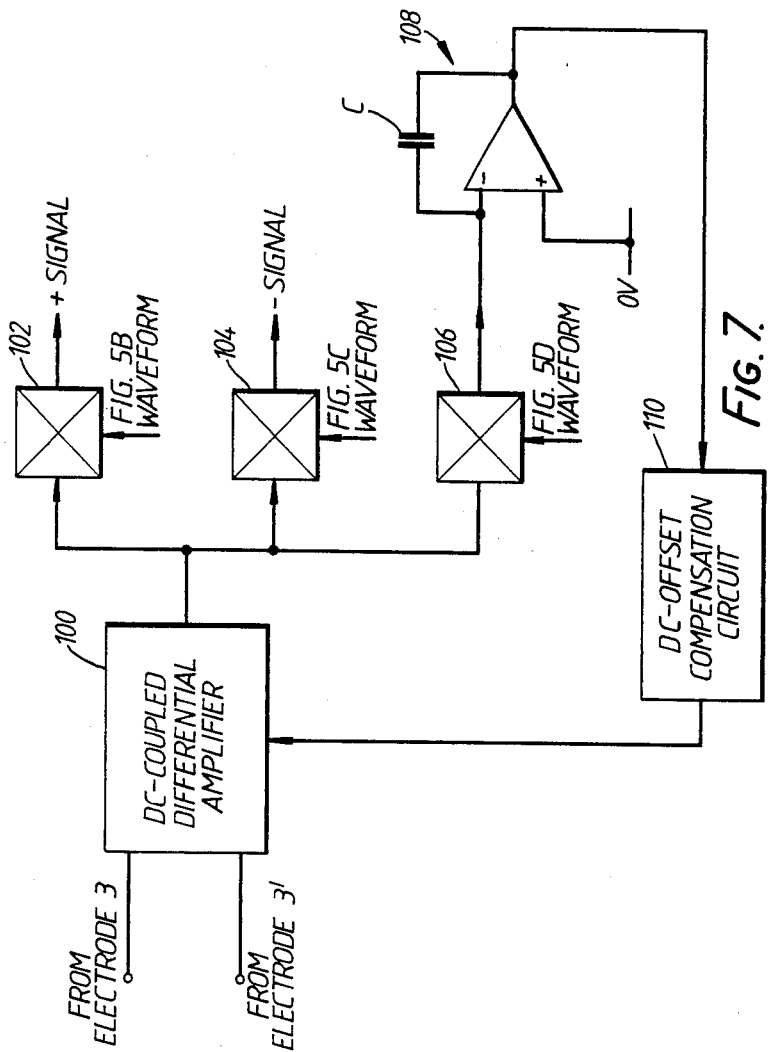

ELECTROMAGNETIC FLOWMETERS AND FLOWMETERING METHODS

This invention relates to electromagnetic flowmeters and flowmetering methods.

In a known type of electromagnetic flowmeter a magnetic field is applied across a fluid the flow of which is to be monitored, the field being applied in the form of spaced-apart pulses in forward and reverse directions, and induced voltage pulses are taken from electrodes in contact with the fluid and electronically processed to generate an output signal representing the flow rate of the fluid. Sometimes, however, a flowmeter of this known type will work satisfactorily when calibrated in the laboratory but gives results which are clearly incorrect when operated on site, even to the extent of indicating zero or negligible flow when the flow is actually substantial.

It is an object of the invention to provide a flowmeter which is less prone to errors of the sort just mentioned.

The present invention provides a circuit for an electromagnetic flowmeter comprising: means to apply across a fluid the flow of which is to be monitored a magnetic field in the form of pulses in forward and reverse directions, the pulses being spaced apart in time, means to sample, at instants during application of the magnetic field, induced signals taken from electrodes in contact with the fluid, and means to process the sampled signals to produce a flow-representing output signal, wherein means are provided to vary the sampling instants to render their spacing non-uniform.

The invention is based on the discovery that cyclically-operating devices such as pumps can have an adverse effect on the accuracy of electromagnetic flowmeters employing pulsed field generation. Inaccuracy arises when there is a substantial degree of synchronism between the action of the pump and the pulsing of the magnetic field. A cyclically-operating pump can give rise to a periodic flow which may drop to zero or near zero in each cycle. If it so happens that the instants at which the flowmeter makes its measurements coincide substantially with those instants at which the flow has dropped to or near zero, the readings obtained will be misleading. The flowmeter according to the invention overcomes that danger because the non-uniform spacing of the sampling instants ensures that a periodic flow is not always measured at the same instant in its cycle.

Preferably, the sampling instants are in fixed relation to the start or the end of each magnetic pulse and the means to vary the sampling instants is arrranged to vary the period of the magnetic pulses to render the spacing of the sampling instants non-uniform.

Advantageously, each sampling instant occurs at a predetermined time interval after the start of a magnetic field pulse. Such an arrangement simplifies the generation of the sampling instants.

The means to vary the sampling instants may be arranged to vary the length of the magnetic pulses but it is preferred that the means to vary the sampling instants is arranged to vary the spacing of the magnetic pulses.

Advantageously, D.C. offset correction means are provided to sample the signals at the electrodes at instants between the magnetic field pulses and provide a correction for D.C. offset in the signals.

Preferably, the D.C. offset correction means is such that a D.C. offset is not reduced to zero before the next D.C. offset sampling instant but is reduced gradually over, a time period during which several D.C. offset sampling instants have occurred. Such an arrangement provides a particularly satisfactory control of D.C. offset.

Preferably, the D.C. offset correction means comprises an integrator circuit with a time constant such as to provide the said gradual reduction.

Preferably, each zero-correction sampling instant occurs at a pedetermined time interval after the end of a magnetic pulse.

Advantageously, the means to vary the sampling instants employs a repeated pseudo-random sequence. By this means, representative sampling of a periodic flow can be achieved quite simply.

Preferably, the means to vary the sampling instants comprises means to generate a length for each magnetic pulse consisting of a fixed length in combination with a variable length selected from one of a plurality of values.

Preferably, means to vary the sampling instants comprises means to generate a spacing between consecutive magnetic pulses consisting of a fixed spacing in combinat,ion with a variable spacing selected from one of a plurality of predetermined values. Such a means may take quite a simple form. For example, the circuit may include a microprocessor to control the operation of the flowmeter and the plurality of predetermined values may be defined by software controlling the operation of the microprocessor.

Preferably, the pseudo-random sequence is in the form of a look-up table in the software defining successive values for the variable length or spacing.

Preferably, the spacing of the magnetic field pulses is varied between 1 and 3 times the duration of a single magnetic field pulse, the magnetic field pulses being of uniform duration.

Preferably, the spacing of the magnetic field pulses is varied between 1 and 2 times the duration of a single magnetic field pulse.

Preferably, the spacing of the magnetic field pulses is varied between 1 and 1½ times the duration of a single magnetic field pulse.

Where the spacing is varied between 1 and 3 times, the plurality of predetermined values may consist of zero, one half, the whole of, and twice the duration of a single magnetic pulse.

Where the spacing is varied between 1 and 2 times the plurality of predetermined values may consist of zero, one third, two thirds and the whole of the duration of a single magnetic pulse.

Where the spacing is varied between 1 and 1½ times the plurality of predetermined values may consist of zero, one sixth, one third and one-half the duration of a single magnetic pulse.

The above values enable the invention to be implemented in a particularly simple and effective manner.

The invention also provides a method of flowmetering comprising: applying across a fluid the flow of which is to be monitored a magnetic field in the form of pulses in forward and reverse directions, the pulses being spaced apart in time, sampling, at instants during application of the magnetic field, induced signals taken from electrodes in contact with the fluid, and processing the sampled signals to produce a flow-representing output signal, wherein the sampling instants are varied to render their spacing non-uniform.

Figure 2:
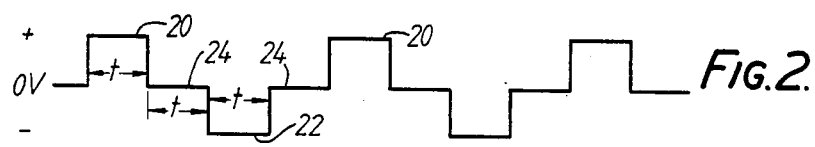
Figure 3:
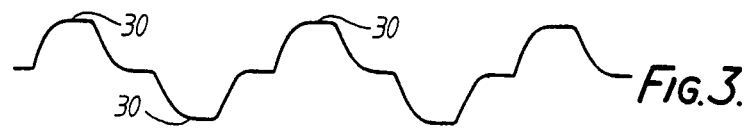
Figure 4A:
Figure 4B:
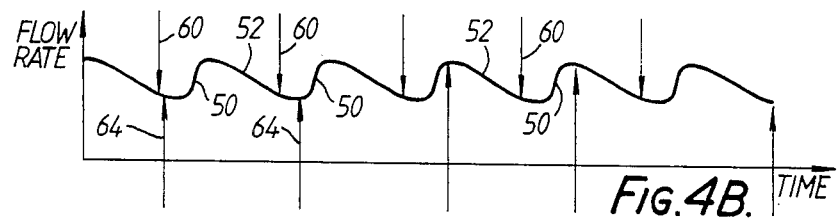
Figure 4C:
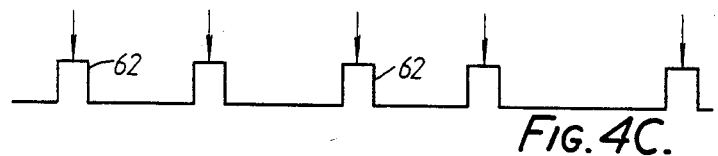
Figure 5A:
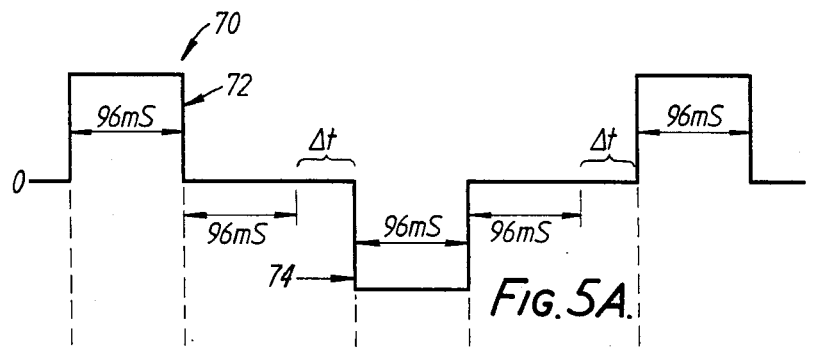
Figure 5B:
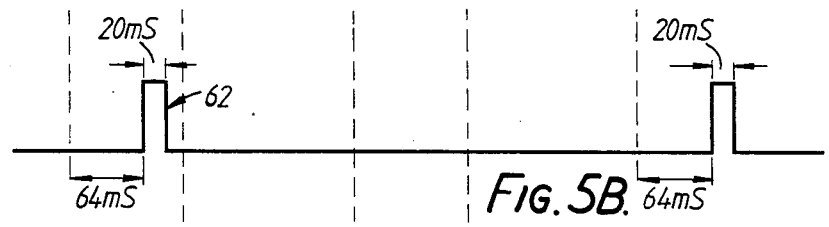
Figure 5C:
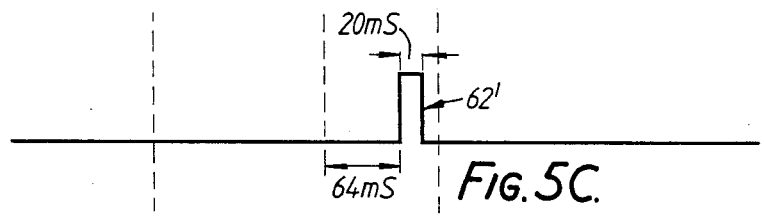
Figure 5D:
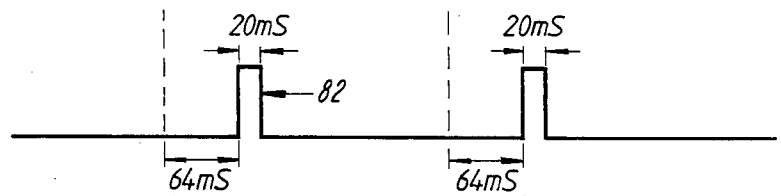

A flowmeter and a flowmetering method in accordance with the invention will now be described by way of example only with reference to the accompanying drawings, in which:

FIG. 1 is a block diagram of the flowmeter,

FIG. 2 shows a prior art excitation waveform applied to field coils of the flowmeter, FIG. 3 shows the waveform of current through the field coils, FIG. 4 shows a prior art sampling waveform applied to a synchronous demodulator of the flow-meter, FIG. 4B is a graph showing variations in flow rate with time in a flow system with a cyclicallyoperating pump, FIG. 4C shows a sampling waveform in accordance with the invention applied to the synchronous demodulator, the relationship in time of the waveforms and flow rate of FIGS. 4A, 4B, 4C being marked by arrows, FIG. 5A shows to an enlarged scale an excitation waveform in accordance with the invention applied to the field coils, FIG. 5B shows, in correct phase relationship to the waveform of FIG. 5A, a sampling waveform in accordance with the invention for sampling the induced voltage during field pulses in one direction, FIG. 5C shows, in correct phase relationship to the waveform of FIG. 5A, a sampling waveform in accordance with the invention for sampling the induced voltage during field pulses in the opposite direction, FIG. 5D shows, in correct phase relationship to the waveform of FIG. 5A, a sampling waveform in accordance with the invention for sampling the signal at the electrodes between field pulses for the purpose of zero correction, FIG. 6 shows a look-up table embodied in software for generating the waveform in accordance with the invention, and FIG. 7 is a schematic drawing of signal sampling and zero correction circuitry of the invention.

Referring to the drawings and FIG. 1 in particular, a flowmeter 1 comprises a measuring conduit 2 (seen in cross-section) and a pair of opposed electrodes 3 and 3' in electrical contact with fluid flowing through the conduit. Field coils, illustrated diagrammatically as reference 4, are arranged to apply a magnetic field orthogonal to the direction of fluid flow in the measuring conduit 2 and orthogonal by a line joining the electrodes 3 and 3'.

An excitation generator 5 is arranged to apply an excitation waveform to the field coils 4. The electrodes 3 and 3' are connected to signal processing circuitry 6 operative to produce a DC output signal 7 representing flow rate. Further circuitry, not shown, is provided to convert the DC output signal to frequency as is usually done in flowmeters.

The signal processing circuitry 6 comprises a differential amplifier 8, connected to receive signals from the electrodes 3 and 3' as inputs, and a synchronous demodulator 9 connected to receive its input from the differential amplifier 8 and to receive a sampling waveform from the excitation generator 5. The DC output signal 7 is taken from the output of the synchronous demodulator 9.

To the extent described in the last three paragraphs, the arrangement shown in FIG. 1 is known to those skilled in the art and for that reason it is unnecessary to elaborate on details of the circuitry. A detailed circuit for a flowmeter of this type can in any case be found in our British application No. 85. 28964 (U.S. Ser. No. 931,201) or British application No. 85. 28965.

If the flowmeter were to be operated in accordance with the prior art then the excitation waveform for the field coils 4 would take the form of the waveform shown in FIG. 2. The waveform shown in FIG. 2 comprises positive pulses 20 of duration t alternating with negative pulses 22 (equal and opposite to the pulses 20) also of duration t, the positive and negative pulses being separated by intervals 24 again of duration t. The inductance of the field coils 4 precludes the current through the coils from following exactly the excitation waveform and the actual current (and hence the magnetic field generated) has a waveform somewhat of the form shown in FIG. 3. In the regions 30, the current and field have reached reasonably steady values and a sampling waveform of the form shown in FIG. 4A would enable the signals from the electrodes 3 and 3' to be sampled during these times when the field is relatively steady: The sampling waveform shown in FIG. 4A consists of pulses 40 of duration t/2 (corresponding to the second halves of the pulses 20 and 22) and defining the times at which the synchronous demodulator 9 samples the output of the differential amplifier 8.

As stated, the waveforms of FIGS. 2, 3 and 4A relate to what would be the case if the flowmeter were to be operated in accordance with the prior art. The disadvantageous effects of such prior art operation will now be explained with reference to FIG. 4B.

FIG. 4B shows the variations in flow rate with time which might occur in a flow system with a cyclically-operating pump. Each time in its cycle the pump pushed fluid onwards the flow rate would increase as in the regions 50 shown in FIG. 4B. Thereafter, the flow rate might peak and drop again as shown in the regions 52 until the next stroke of the pump pushing fluid onwards. We have discovered that it is quite possible for a substantial degree of synchronism to arise in practice between such periodic variations in the flow rate and the sampling times for the synchronous demodulator 9 with the unfortunate result that the flowmeter "looks" at the flow system at more or less always the same instant in the flow rate variation cycle. The double-headed arrows 60 show how the sampling times may coincide with troughs in the flow rate variation, the result being that the flow rate indicated by the flowmeter (which would be expected to indicate the mean value of the actual flow rate) will be much too low. In an extreme case, the troughs in the flow rate variation might reach zero flow so that the flowmeter could indicate zero flow even with fluid being pumped through the system.

In accordance with the invention, however, the magnetic pulses (and hence the sampling pulses in synchronism with them) are not uniformly spaced but the spacing between the pulses is varied FIG. 4C shows an example of sampling pulses 62 in accordance with the invention and the double-headed arrows 64 show that the sampling pulses sometimes coincide with a trough in the flow rate variation, sometimes with a peak and sometimes with an intermediate portion, the effect being that representative sampling of the periodic flow is achieved.

FIGS. 5A, 5B and 6 show the prefered form of nonuniformly spaced excitation waveform and sampling pulses according to the invention.

FIG. 5A shows the excitation waveform 70 produced by the excitaticn generator 5 in accordance with the invention. The waveform 70 consists of positive pulses 72 of 96 millisecond duration alternating with negative pulses 74 (equal and opposite to the pulses 72) also of 96 millisecond duration. The spacing between a positive pulse 72 and a negative pulse 74 being 96+$\Delta t$ millisecond, where $\Delta t$ has the value 0, 16, 32 or 48 millisecond.

The selection of value for $\Delta t$ from among the four values 0, 16, 32 or 48 millisecond is made on a pseudo-random basis. The flowmeter includes a microprocessor (not shown) with software control to generate the timings of the excitation and sampling waveforms. The software includes the look-up table shown in FIG. 6 which corresponds to a pseudo-random sequence (of the four values for $\Delta t$) twelve digits long. The variable n is incremented by one from an initial value of one until twelve is reached whereupon n is reset to one and thereafter incremented again up to twelve, reset and so on. The look-up table is used to define the successive values chosen for $\Delta t$, $\Delta t$ taking in turn each of the values set out in the table which is then repeated indefinitely.

FIGS. 5B and 5C show the sampling pulses 62 and 62', each of which starts 64 milliseconds after the start of, respectively, a forward and reverse pulse in the the excitation waveform 70 and is of 20 milliseconds duration. The pulses 62 are used for sampling the induced signal when the field is in the forward direction and the pulses 62' are used for sampling the induced signal when the field is in the reverse direction.

The signal at the electrodes 3 and 3' is sampled also between the excitation pulses to determine the D.C. offset in the signal from the electrodes. A discussion of the problems of D.C. offset in flowmeter signals is to be found in our co-pending application No. 85.28965. The D.C. offset sampling is carried out by means of D.C. offset sampling pulses 82 shown in FIG. 5, the pulses 82 occurring 64 milliseconds after the end of each excitation pulse 72 or 74 and having a duration of 20 milliseconds.

The signal sampling and zero correction circuitry of the flowmeter is shown in FIG. 7.

A D.C.-coupled differential amplifier 100 such as is shown in FIGS. 3 or 4 of either of the two co-pending applications mentioned earlier is connected to receive the signal from the electrodes 3 and 3'. The output of the amplifier is applied to three analogue gates 102, 104 and 106 which are gated by, respectively, the waveforms of FIGS. 5B, 5C and 5D. The output fromgates 102 and 104 are processed to provide an output representing flowrate (suitable circuitry is disclosed in the two co-pending applications mentioned earlier).

The output from gate 106 is applied to the input of an integrator 108 in the form of an operational ampifier having a capacitor C connected from its output to its inverting input. The output from the gate 106 is connected to the inverting input of amplifier 108 and the non-inverting input of the amplifier is connected to common potential. The time constant of theintegrator 108 is such that reduction of a D.C. offset is achieved only gradually extending over a time durng which several of the sampling pulses shown in FIG. 5D have occurred.

The output from the integrator 108 is connected to the input of a D.C. offset compensation circuit 110 the output of which is connected to control the amplifier 100 in such a way as to reduce the effects of D.C. offset in the signal at the electrodes 3 and 3'. An example of a suitable circuit for the compensation circuit 110 is to be found in FIG. 5 of the two co-pending applications mentioned earlier.

Other values for $\Delta t$ may be used besides those shown in FIG. 6. For example, a set of values twice those shown in FIG. 6 or three times those shown in FIG. 6 may be used.

It is possible, instead of inserting $\Delta t$ in the spacing between excitation pulses, to insert it during the excitation pulses so as to make the spacing between pulses constant but the duration of the pulses variable. It is also possible to keep the period of the excitation pulses constant but to vary the position of the sampling instants within the excitation pulses.

Instead of using a microprocessor and software control, the non-uniform spacing of the sampling instants may be achieved using modulation of the pulse width of pulses generated by a multivibrator type circuit.

I claim:

1. A circuit for an electromagnetic flowmeter having input and output terminals in juxtaposition relative to a flow of fluid to be monitored comprising, means for applying an input waveform across said input terminals to generate an electromagnetic field having magnetic pulses, timing means for randomly varying the time intervals between said pulses, sampling means for producing sampling signals for sampling output wave forms from said output terminals at predetermined times between the leading and trailing edges of said pulses, and means for processing said sampled signals to generate a flow representing output signal.

2. A circuit according to claim 1 wherein said electromagnetic field has positive and negative pulses.

3. A circuit according to claim 1 wherein the sampling time for at least some of said sampling signals is in fixed relation to one end of least one of said pulses.

4. A circuit according to claim 3 wherein said timing means includes means to generate a length for each said magentic pulse consisting of a fixed length in combination with a variable length selected from one of a plurality of predetermined values.

5. A circuit according to claim 4 wherein said plurality of predetermined values consists of zero, one half, the whole of, and twice the duration of a single one of said pulses.

6. A circuit according to claim 4 wherein said plurality of predetermined values consists of zero, one third, two thirds and the whole of the duration of one of said pulses.

7. A circuit according to claim 4 wherein said plurality of predetermined values consists of zero, one sixth, one third and one half the duration of one of said pulses.

8. A circuit according to claim 1 wherein said timing means operate to render the periods of said pulses non-uniform.

9. A circuit according to claim 1 including D.C. offset correction means to sample said output wave forms during said time intervals to provide a correction for D.C. offset in said input wave form.

10. A circuit according to claim 9 wherein said D.C. offset correction means is such that a D.C. offset is not reduced to zero before the next D.C. offset sampling instant but is reduced gradually over a time period during which several D.C. offset sampling instants have occurred.

11. A circuit as claimed in claim 10 wherein said D.C. offset correction means includes an integrator circuit with a time constant such as to provide said gradual reduction.

12. A circuit according to claim 1 wherein said timing means includes means for generating a repeated pseudo-random sequence to nonuniformly generate said intervals of time.

13. A circuit according to claim 12 wherein said pseudo-random sequence is in the form of a look-up table in software defining successive values for variable spacings.

14. A circuit according to claim 1 wherein said timing means includes means to generate a spacing between consecutive ones of said magnetic pulses consisting of a fixed spacing in combination with a variable spacing selected from one of a plurality of predetermined values.

15. A circuit according to claim 1 wherein said pulses are of uniform duration and wherein the spacing of said pulses is varied between 1 and 3 times the duration of a single pulse.

16. A circuit according to claim 1 wherein said pulses are of uniform duration and wherein the spacing of said pulses is varied between 1 and 2 times the duration of a single pulse.

17. A circuit according to claim 1 wherein said pulses are of uniform duration and wherein the spacing of said pulses is varied between 1 and 1½ times the duration of a single pulse.

18. A method for measuring fluid flow comprising the steps of applying an input waveform across said flow to generate an electromagnetic field having magnetic pulses and a corresponding output voltage signal indicative of said flow, randomly varying the time intervals between said pulses, sampling said voltage signal at predetermined times between the leading and trailing edges of said pulses to produce sampled signals, and processing said sampled signals to generate a flow representing output signal.

19. A method according to claim 18 wherein said electromagnetic field has positive and negative pulses.

20. A method according to claim 18 wherein said sampling time for at least some of said sampling signals is in fixed relation to one end of at least one of said pulses.

21. A method according to claim 20 wherein said randomly varying said time intervals includes the step of generating a length for each said magnetic pulse consisting of a fixed length in combination with a variable length selected from one of a plurality of predetermined values.

22. A method according to claim 21 wherein said plurality of predetermined values consists of zero, one half, the whole of, and twice the duration of a single one of said pulses.

23. A method according to claim 21 wherein said plurality of predetermined values consists of zero, one third, two thirds and the whole of the duration of one of said pulses.

24. A method according to claim 21 wherein said plurality of predetermined values consists of zero, one sixth, one third and one half the duration of one of said pulses.

25. A method according to claim 18 wherein randomly varying said time intervals operates to render the periods of said pulses non-uniform.

26. A method according to claim 18 including the step of sampling said output voltage signal and pursuant thereto providing a correction for D.C. offset in said input wave form.

27. A method according to claim 26 wherein said correction is such that a D.C. offset is not reduced to zero before the next D.C. offset sampling instant but is reduced gradually over a time period during which several D C. offset sampling instants have occurred.

28. A method as claimed in claim 27 including the step in connection with said correction of integrating with a time constant such as to provide said gradual reduction.

29. A method according to claim 18 wherein said randomly varying said time intervals includes the step of generating a repeated pseudo-random sequence to generate said nonuniform intervals of time.

30. A method according to claim 29 wherein said pseudo-random sequence involves consulting a look-up table in software defining successive values for variable spacings.

31. A method according to claim 18 wherein said randomly varying said time intervals includes the step of generating a spacing between consecutive ones of said magnetic pulses consisting of a fixed spacing in combination with a variable spacing selected from one of a plurality of predetermined values.

32. A method according to claim 18 wherein said pulses are of uniform duration and wherein the spacing of said pulses is varied between 1 and 3 times the duration of a single pulse.

33. A method according to claim 18 wherein said pulses are of uniform duration and wherein the spacing of said pulses is varied between 1 and 2 times the duration of a single pulse.

34. A method according to claim 18 wherein said pulses are of uniform duration and wherein the spacing of said pulses is varied between 1 and 1½ times the duration of a single pulse.

* * * * *